United States Patent
Jachner (10) Patent No.: US 7,974,399 B2
(45) Date of Patent: Jul. 5, 2011

(54) ENHANCED WHISPER FEATURE

(75) Inventor: Jack Jachner, Plano, TX (US)

(73) Assignee: Alcatel Lucent, Paris (FR)

( * ) Notice: Subject to any disclaimer, the term of this patent is extended or adjusted under 35 U.S.C. 154(b) by 1301 days.

(21) Appl. No.: 11/274,434

(22) Filed: Nov. 15, 2005

(65) Prior Publication Data

US 2007/0121865 A1    May 31, 2007

(51) Int. Cl.
*H04M 3/42* (2006.01)
(52) U.S. Cl. ............ 379/202.01; 379/201.01; 379/201.1
(58) Field of Classification Search ............ 379/201.01, 379/201.1, 202.1, 202.01
See application file for complete search history.

(56) References Cited

U.S. PATENT DOCUMENTS

| | | | |
|---|---|---|---|
| 5,034,947 A * | 7/1991 | Epps | 370/268 |
| 5,195,087 A * | 3/1993 | Bennett et al. | 370/264 |
| 6,178,237 B1 | 1/2001 | Horn | |
| 6,658,095 B1 * | 12/2003 | Yoakum et al. | 379/93.01 |
| 6,768,722 B1 * | 7/2004 | Katseff et al. | 370/260 |
| 2004/0047461 A1 * | 3/2004 | Weisman et al. | 379/202.01 |
| 2006/0025220 A1 * | 2/2006 | Macauley et al. | 463/42 |
| 2006/0085417 A1 * | 4/2006 | John et al. | 707/6 |
| 2007/0003044 A1 * | 1/2007 | Liang et al. | 379/215.01 |
| 2007/0060096 A1 * | 3/2007 | Hayakawa | 455/403 |

FOREIGN PATENT DOCUMENTS

CA    2209707 A1    1/1999

* cited by examiner

*Primary Examiner* — Ahmad F Matar
*Assistant Examiner* — Oleg Asanbayev
(74) *Attorney, Agent, or Firm* — Garlick Harrison & Markison, LLP (57) ABSTRACT

An enhanced whisper feature enables a user to engage simultaneously in disparate telephonic communication sessions by isolating audible input of the user from a select one of the telephonic communication sessions while providing audible output from each of the telephonic communication sessions to the user. The whisper feature can be further enhanced using a presence system that maintains presence information indicating the availability of the user. The presence system can enable the whisper feature of the user upon determining that the user is currently engaged in a first telephonic communication session when a request for the user to engage in a second telephonic communication session is received. In addition, the whisper feature can include a silent ring mode that is activated upon receipt of the request for the user to engage in the second telephonic communication session.

11 Claims, 6 Drawing Sheets

ENHANCED WHISPER FEATURE

BACKGROUND OF THE INVENTION

1. Technical Field of the Invention

The present invention relates in general to features enabling users to simultaneously engage in multiple telephonic communication sessions, and in particular, to a whisper feature for isolating telephonic input between the telephonic communication sessions.

2. Description of Related Art

Multi-telephony behaviors in which a user actively participates in multiple, concurrent telephonic conversations are becoming more prevalent. For example, private Branch Exchange (PBX) and Class 5 switches currently provide a "whisper" feature, typically to Call Centers, that enables a supervisor to speak into the ear of a Call Center Agent to provide help or training while the Call Center Agent is on the phone with a customer. The Call Center Agent is able to hear both the supervisor and the customer at the same time, but the supervisor's voice is heard only by the Call Center Agent, not by the customer. As a result, the current "whisper" feature allows the Call Center Agent to simultaneously listen to both the supervisor and the customer without the customer being aware that the supervisor is participating in the conversation.

However, anything the Call Center Agent says is heard by both the customer and the supervisor. Therefore, the Call Center Agent is not able to ask questions or respond to the supervisor without the customer hearing the Call Center Agent. Unfortunately, the current "whisper" feature does not provide a mechanism for isolating what is spoken by the Call Center Agent between the two conversations.

Another multi-telephony behavior that allows at least partial isolation between conversations is a "two handset operation." Many individuals now have more than one phone, such as a desktop phone, fixed phone, cordless phone and/or one or more mobile phones, which can be operated simultaneously to carry on separate conversations. However, there is an inherent lack of privacy and a risk of bleed-through between the conversations when using multiple phones. In addition, one of the conversations may be disruptive to another conversation. For example, if a participant in a conference call receives another call on his or her mobile phone, the mobile phone conversation may be overheard by the other meeting participants, thereby disrupting the meeting.

To improve isolation between the two conversations, many phone terminals now provide a mute button that enables a user to mute the conversation. Pressing the mute button prevents the other party to the conversation from hearing the user, but still allows the user to hear that party. Thus, when involved in two separate calls, the user is able to hear both parties, but only one of the parties is able to hear the user, depending on which phone is muted. However, the initial ringing of the second call may be annoying to the user and the other party involved in the first call. In addition, in order to answer the second call privately, the user must remember to mute the first call before answering the second call, which makes such two handset operation difficult and cumbersome.

Therefore, what is needed is an enhanced whisper feature that facilitates the occurrence of multiple simultaneous telephonic conversations. In addition, what is needed is an enhanced whisper feature that provides simple and efficient isolation between multiple telephonic conversations.

SUMMARY OF THE INVENTION

Embodiments of the present invention provide a telephony system for providing an enhanced whisper feature. The telephony system includes at least one call server operable to establish disparate and concurrent telephonic communication sessions with a user and at least one switch that enables the whisper feature by isolating audible input of the user from a select one of the telephonic communication sessions while providing audible output from each of the telephonic communication sessions to the user. The switch thereby enables the user to select between the telephonic communication sessions.

In one embodiment, the call server is operable to connect the telephonic communication sessions to a user telephonic device associated with the user and to converge the audible output of both of the telephonic communication sessions to that user telephonic device. In a further embodiment, the call server includes both the switch and a respective call handler in communication with the switch to manage each of the telephonic communication sessions. In yet a further embodiment, each call handler includes a respective switch for selectively providing the audible input of the user to the respective telephonic communication sessions. In a still further embodiment, the call server further includes a processor operable to enable the whisper feature and provide a whisper control signal to the switch to isolate the audible input of the user from the select one of the telephonic communication sessions. In an additional embodiment, the processor is operable to receive a switch whisper signal from the user to control switching of the switch.

In another embodiment, each of the telephonic communication sessions is handled by a respective call server, and each respective call server includes a respective switch. In yet another embodiment, a respective user telephonic device of the user is associated with each of the telephonic communication sessions, and at least one of the user telephonic devices includes a silent ring mode that is activated upon enablement of the whisper feature.

Embodiments of the present invention further provide a telephony system for providing a presence-enhanced whisper feature that enables a user to simultaneously engage in disparate telephonic communication sessions. The telephony system includes a presence system maintaining presence information indicating the availability of the user. The presence system is operable to determine that the user is currently engaged in a first telephonic communication session when a request for the user to engage in a second telephonic communication session is received. A switch in communication with the presence system enables the whisper feature by isolating audible input of the user from the first telephonic communication session while providing audible output from each of the first telephonic communication session and the second telephonic communication session to the user.

In one embodiment, the presence system is operable to update the presence information of the user based on the request and to provide the updated presence information to watchers of the user to enable the whisper feature. For example, in an exemplary embodiment, the switch is included in a call server operable to establish at least the first communication session with the user. The call server is a watcher of the user that receives the updated presence information and controls the switch in response to the updated presence information. In another exemplary embodiment, the switch is included in a telephonic device associated with the user that is engaged in at least one of the first telephonic communication session and the second telephonic communication session. The user telephonic device is a watcher of the user that receives the updated presence information and controls the switch in response to the updated presence information.

Embodiments of the present invention further provide a method for providing a whisper feature to enable a user to simultaneously engage in disparate telephonic communication sessions. The method includes determining that the user is engaged in a first telephonic communication session and receiving a request for the user to engage in a second telephonic communication session. The method further includes isolating audible input of the user from the first telephonic communication session, providing the audible input of the user to the second telephonic communication session and providing audible output from each of the first telephonic communication session and the second telephonic communication session to the user.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
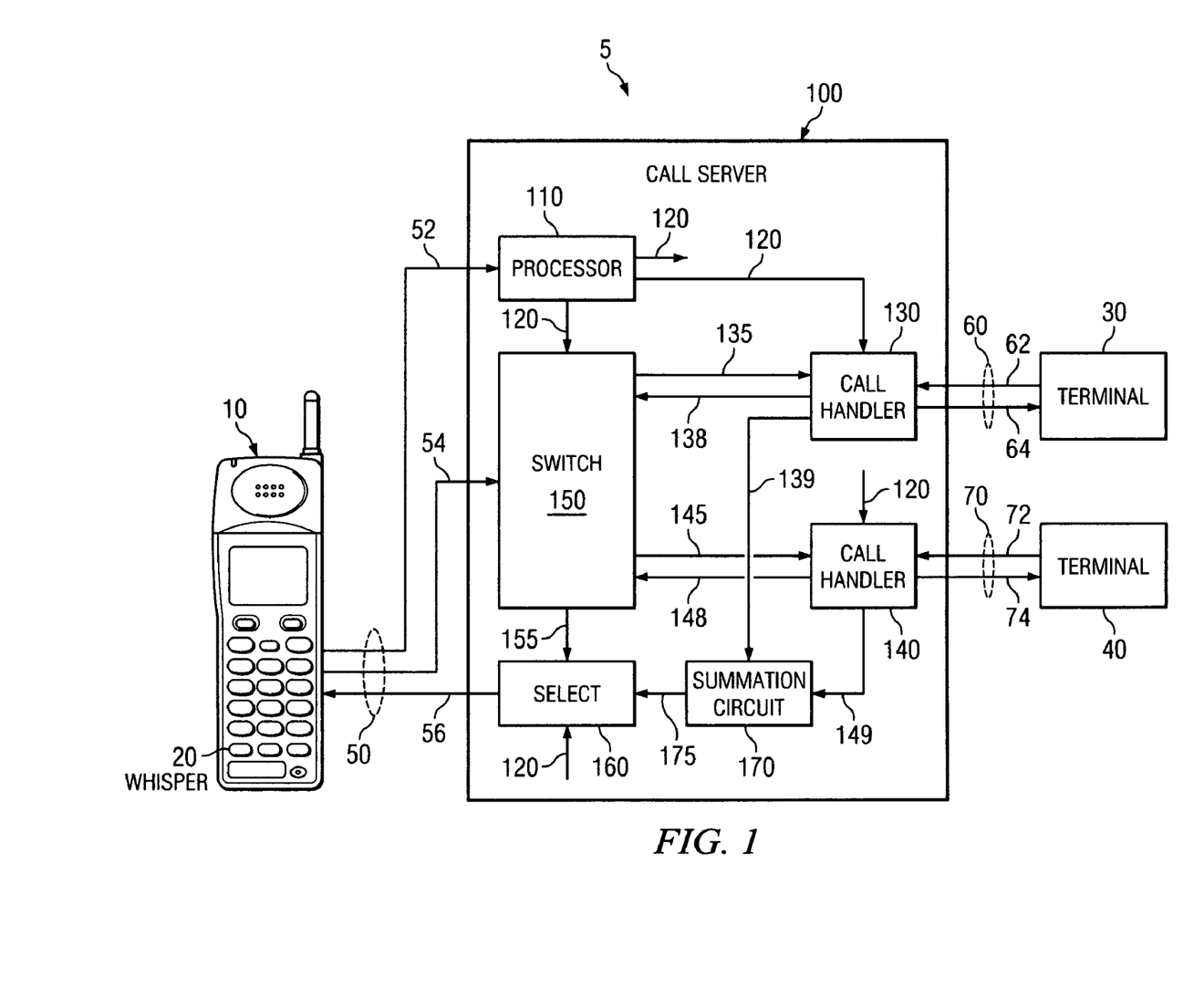
FIG. 1 illustrates an exemplary telephony system for providing an enhanced whisper feature, in accordance with embodiments of the present invention.

Referring to FIG. 1, there is illustrated an exemplary telephony system 5 for providing an enhanced whisper feature, in accordance with embodiments of the present invention. The telephony system 5 shown in FIG. 1 includes a user telephonic device 10 and a call server 100. The call server 100 represents any type of network device, such as a circuit switch, router, gateway or other switching device, capable of connecting telephonic communication sessions to the user telephonic device 10. By way of example, but not limitation, the call server 100 can include a private branch exchange (PBX) or Class 5 switch in the Public Switched Telephone Network (PSTN), a mobile switching center in the Public Land Mobile Network (PLMN), a router or any other type or combination of network devices.

The user telephonic device 10 is a physical communications device capable of sending and/or receiving voice communications over an interface 50 to the call server 100. Examples of user telephonic devices 10 include, but are not limited to, a desktop phone, a fixed phone, a cordless phone, a cell phone and a computer providing voice technology (e.g., a computer having speakers, a microphone and voice software). The interface 50 represents any type of medium over which speech may be sent. For example, the interface 50 can include a T1 line, cable line, fiber optic line, an air interface or other medium capable of transmitting speech. In FIG. 1, the interface 50 is shown logically divided, for ease of explanation, into a signal line 52 for sending messages between the user telephonic device 10 and the call server 100, a transmit line 54 for transmitting speech from the user telephonic device 10 to the call server 100 and a receive line 56 for transmitting speech from the call server 100 to the user telephonic device 10.

The transmit line 54 is shown logically connected to a switch 150 within the call server 100 that performs the call switching for the call server 100. Thus, switch 150 represents the switching fabric within the call server 100 that routes calls to and from the user telephonic device 10. The receive line 56 is shown logically connected to a select switch 160 in the call server 100 that selects the output from either the switch 150 or a summation circuit 170 within the call server 100, depending on whether the enhanced whisper feature is active, and provides the selected output to the user telephonic device 10 over line 56. The signal line 52 is shown logically connected to a call processor 110 within the call server 100 to activate the enhanced whisper feature of the present invention. The call processor 110 is generally understood to be a device that drives a general-purpose computer. It is noted, however, that other processor devices such as microcontrollers, Field Programmable Gate Arrays (FPGAs), or Application Specific Integrated Circuits (ASICs), or a combination thereof, can be used as well and achieve the benefits and advantages described herein.

The call processor 110 is operably coupled to one or more call handlers 130 and 140, the switch 150 and the select switch 160 to manage communication sessions with the user telephonic device 10. For example, in one embodiment, the call processor 110 is operable to detect communication sessions coming into the call server 100, allocate resources in the switch 150 for communication sessions, assign call handlers 130 and 140 to each of the communication sessions, process messages related to the communication sessions, enable call features, such as the enhanced whisper feature, and control the select switch 160 for the enhanced whisper feature. The call processor 110 can be implemented entirely within the call server 100 or can be at least partially implemented on an adjunct system controlling the behavior of the call server 100.

Each call handler 130 and 140 includes any hardware, software, firmware, or combination thereof for managing a particular telephonic communication session with the user telephonic device 10. As an example, each call handler 130 and 140 could include one or more processors that execute instructions and one or more memories that store instructions and data used by the processors. The call handlers 130 and 140 can be at least partially implemented within the switch 150 and/or the call processor 110.

As shown in FIG. 1, call handler 130 is configured to manage a first telephonic communication session between the user telephonic device 10 and a first terminal 30 over interface 60, while call handler 140 is configured to manage a second telephonic communication session between the user telephonic device 10 and a second terminal 40 over interface 70. Again, interfaces 60 and 70 represent any type of medium over which speech may be sent, and each are shown logically divided, for ease of explanation, into a respective transmit line 62 and 72 for transmitting speech from the terminals 30 and 40 to the call server 100 and a respective receive line 64 and 74 for transmitting speech from the call server 100 to the terminals 30 and 40.

The first telephonic communication session and the second telephonic communication session are disparate from one another, such that each telephonic communication session is capable of being separately routed through switch 150 to the user telephonic device 10. To illustrate how the telephonic communication sessions are disparate from one another, consider a "call waiting" feature that enables the user telephonic device 10 to switch between the two telephonic communication sessions. If the user is involved in the first telephonic communication session with terminal 30 when the second telephonic communication session with terminal 40 is initiated, the user can "answer" the second telephonic communication session using a "call waiting" button on the user telephonic device 10. Upon pressing the "call waiting" button, the user telephonic device 10 sends an activate call waiting feature signal over line 52 to the call processor 110. The call processor 110, in turn, enables the call waiting feature and provides instructions to call handlers 130 and 140, switch 150 and select switch 160 over lines 120 to activate the call waiting feature.

After activating the call waiting feature, audible output from terminal 30 that is transmitted over line 62 and received at call handler 130 is not transmitted to switch 150 over line 138. Instead, audible output from terminal 40 that is transmitted over line 72 and received at call handler 140 is transmitted to switch 150 over line 148. Switch 150 routes the audible output received on line 148 to the select switch 160 on line 155, which in turn, routes the audible output received on line 155 to the user telephonic device 10 over line 56. Likewise, audible input from the user telephonic device 10 that is transmitted over line 54 and received at switch 150 is not routed to call handler 130 over line 135. Instead, audible input received over line 54 is routed by the switch 150 to call handler 140 over line 145. Therefore, each telephonic communication session is separately switched through switch 150 to the user telephonic device 10.

Although the first telephonic communication session and the second telephonic communication session can be considered concurrent communication sessions, with traditional "call waiting" features, the user is able to engage in only one of the disparate telephonic communication session at a time. Thus, only one of the telephonic communication sessions is considered an "active" communication session. In some situations, a user of the user telephonic device 10 may want to engage in both telephonic communication sessions simultaneously using a "whisper" feature. However, as discussed above, current whisper features do not allow the audible input from the user telephonic device 10 to be isolated between the two telephonic communication sessions.

Therefore, in accordance with embodiments of the present invention, an enhanced whisper feature is provided to the user telephonic device 10 that enables the user telephonic device 10 to simultaneously engage in disparate telephonic communication sessions, while isolating the audible input between the telephonic communication sessions. The enhanced whisper feature is activated at the initial call setup using a whisper button 20 on the user telephonic device 10. For example, if the user telephonic device 10 is currently engaged in the first telephonic communication session with terminal 30, and a request to establish a second telephonic communication session is received from terminal 40, the user can press the whisper button 20 to activate the enhanced whisper feature at the time of establishing the second telephonic communication session with terminal 40. In other embodiments, the enhanced whisper feature is activated automatically in the call server 100 or through another ancillary device, such as a personal computer.

Upon activating the enhanced whisper feature, the call server 100 isolates the audible input of the user from the first telephonic communication session to enable the user to speak only to the party on terminal 40 in the second telephonic communication session. However, audible output from both terminals 30 and 40 is provided to the user telephonic device 10 to allow the user to simultaneously hear both of the parties on terminals 30 and 40. Thus, although the user is able to hear anything that the party on terminal 30 says, the party on terminal 30 is not able to hear anything said by the user. Once the whisper feature is active, the user can switch the audible input between the telephonic communication sessions using the whisper button 20 in order to speak to either party.

In an exemplary embodiment, if during the first communication session with terminal 30, the call server 100 receives a request for a second communication session from terminal 40, the call server 100 can send a "call waiting" or other similar signal to the user telephonic device 10 informing the user that an incoming call from terminal 40 is waiting at the call server 100. If the user desires to actively engage in the two disparate communication sessions simultaneously, the user can press the whisper button 20 on the user telephonic device 10, which causes the user telephonic device 10 to send an activate whisper feature signal to the call processor 110 over line 52. Upon receiving the activate whisper feature signal, the call processor 110 enables the whisper feature by sending a whisper control signal on lines 120 to the switch 150, call handlers 130 and 140 and the select switch 160. For example, in one embodiment, the call processor 110 includes one or more processes, such as software applications providing an activity, a function, or a systematic sequence of tasks that produces the whisper control signal on lines 120.

The whisper control signal received at switch 150 instructs the switch 150 to route audible input received from the user telephonic device 10 on line 54 to call handler 140. The whisper control signal received at call handlers 130 and 140 instructs the call handlers 130 and 140 to transmit audible output received from terminals 30 and 40, respectively, to the summation circuit 170 on lines 139 and 149, respectively, instead of transmitting the audible output to switch 150 on lines 138 and 148, respectively. The summation circuit 170 converges the audible outputs received on lines 139 and 149 to produce a summed audible output on line 175. The whisper control signal received at select switch 160 instructs the select switch 160 to select the output from the summation circuit 170 on line 175.

Thus, as the user speaks into the user telephonic device 10, the audible input of the user is transmitted over line 54 to the switch 150 in call server 100. The switch 150 routes the audible input received on line 54 to call handler 140 on line 145, which in turn, transmits the audible input received on line 145 to terminal 40 on line 74. In addition, as the parties on terminals 30 and 40 speak, audible output transmitted by terminals 30 and 40 over lines 62 and 72, respectively, and received at respective call handlers 130 and 140 is transmitted from call handlers 130 and 140 to summation circuit 170 over lines 139 and 149, respectively. The summation circuit 170 sums the audible outputs and provides the summed audible output to the select switch 160 on line 175. The select switch 160, in turn, transmits the summed audible output to the user telephonic device 10 over line 56.

If the user wants to switch back to the first telephonic communication session, the user again presses the whisper button 20 on the user telephonic device 10, which causes the user telephonic device 10 to send a switch whisper signal to the call processor 110 over line 52. Upon receiving the switch whisper signal, the call processor 110 transmits a new whisper control signal on line 120 to the switch 150. The new whisper control signal received at switch 150 instructs the switch 150 to route audible input received from the user telephonic device 10 on line 54 to call handler 130 for transmission to terminal 30 over line 64. The call handlers 130 and 140 continue to transmit audible output received from terminals 30 and 40, respectively, to the summation circuit 170 on lines 139 and 149, respectively, for transmission of a summed audible output to the user telephonic device 10 over line 56. Therefore, in general, the enhanced whisper feature isolates the audible input of the user from a select one of the telephonic communication sessions while providing audible output from each of the telephonic communication sessions to the user.

FIG. 1 illustrates an embodiment in which the user is simultaneously engaging in multiple telephonic communication sessions on a single telephonic device 10. However, with most users having more than one phone, the user may need to simultaneously engage in multiple telephonic communication sessions on multiple telephonic devices. With traditional multi-telephony behaviors, there is either a risk of bleed-through between the conversations or the user must remember to press a "mute" button on one of the telephonic devices to isolate the user's speech between the conversations. In accordance with embodiments of the present invention, the enhanced whisper feature can be extended to such multi-telephony behaviors to prevent bleed-through and eliminate the need for the user to operate "mute" buttons on multiple telephonic devices.

Figure 2:
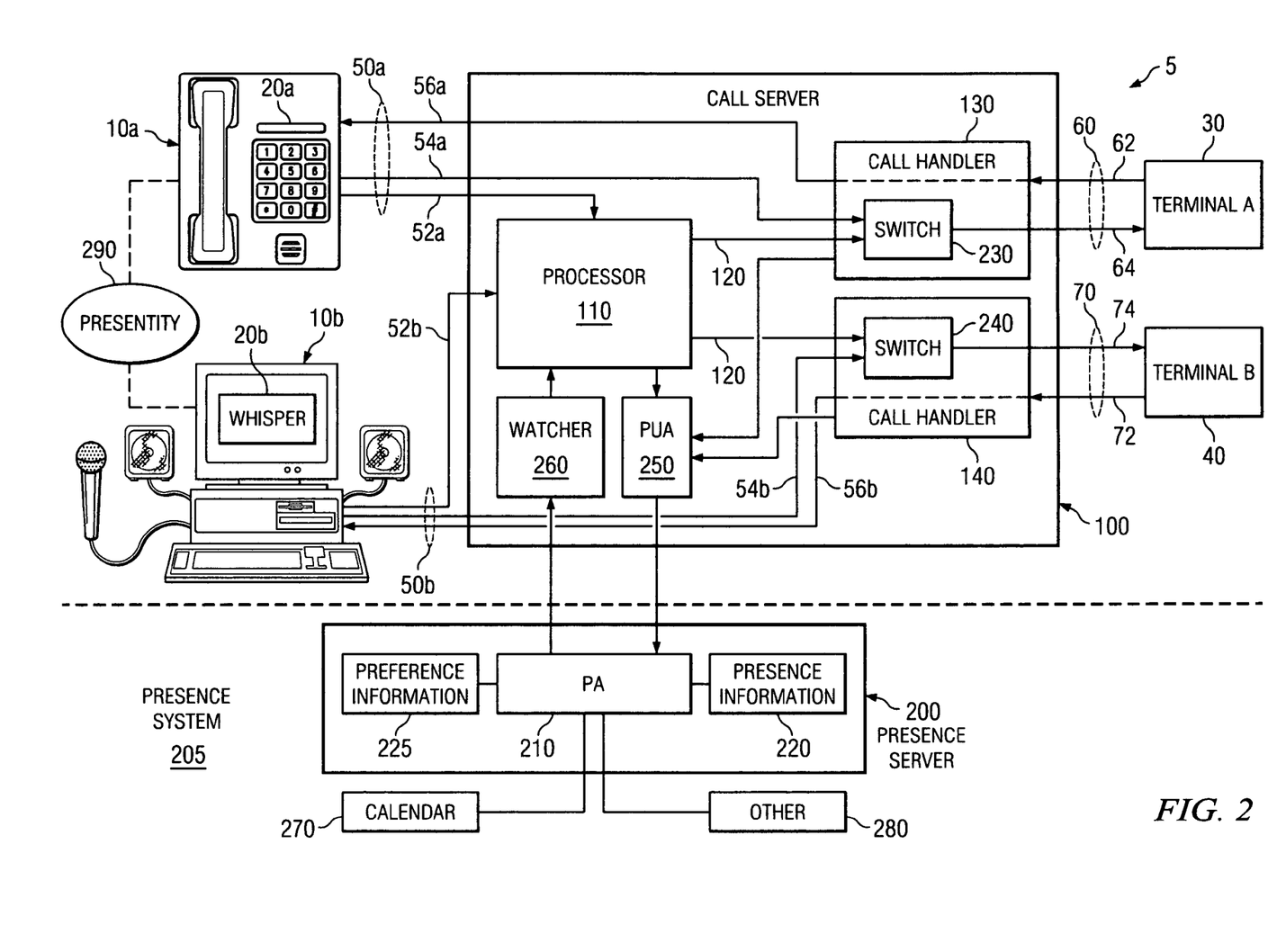
FIG. 2 illustrates an exemplary telephony system for providing a multi-telephony enhanced whisper feature on a call server, in accordance with embodiments of the present invention.

FIG. 2 illustrates an exemplary telephony system 5 for providing a multi-telephony enhanced whisper feature on a call server 100, in accordance with embodiments of the present invention. Instead of a single telephonic device, in FIG. 2, the user is associated with two telephonic devices 10a and 10b. Telephonic device 10a is connected via interface 50a to the call server 100 to engage in a first telephonic communication session with terminal 30, while telephonic device 10b is connected via interface 50b to the call server 100 to engage in a disparate, second telephonic communication session with terminal 40. In addition, call handler 130 is configured to manage the first telephonic communication session between the telephonic device 10a and terminal 30 over interface 60, while call handler 140 is configured to manage the second telephonic communication session between the telephonic device 10b and terminal 40 over interface 70.

More specifically, signal lines 52a and 52b are shown logically connected to the call processor 110 within the call server 100 to enable the enhanced whisper feature of the present invention, while transmit lines 54a and 54b and receive lines 56a and 56b are each logically connected to a respective call handler 130 and 140. Each call handler 130 and 140 is shown including a respective switch 230 and 240 that performs the call switching for the call handler 130 or 140. Together, switches 230 and 240 represent the switching fabric within the call server 100 that routes calls to and from the user telephonic devices 10a and 10b. Thus, switches 230 and 240 together form switch 150 in FIG. 1.

The call processor 110 is again operably coupled to both of the call handlers 130 and 140 to enable the enhanced whisper feature. For example, in an exemplary embodiment, the call processor 110 associates both of the telephonic devices 10a and 10b with a single user, and maintains data indicating the status (e.g., in use or idle) of each telephonic device 10a and 10b. Therefore, when the call server 100 receives a request for a communication session with telephonic device 10b from terminal 40, the call processor 110 determines the identity of the user associated with telephonic device 10b and indexes on the user identity to ascertain the status of all other telephonic devices (e.g., device 10a) associated with the user identity. Regardless of the status of other telephonic devices, if telephonic device 10b is available for the communication session, the call server 100 can "ring" telephonic device 10b, notifying the user that an incoming call to telephonic device 10b is being received at the call server 100.

However, if the user is also engaged in another telephonic communication session between telephonic device 10a and terminal 30, and the user desires to actively engage in the two disparate communication sessions simultaneously, while isolating the audible input between the conversations, in one embodiment, the user can "answer" the call on telephonic device 10b by pressing the whisper button 20b on telephonic device 10b. Pressing the whisper button 20b causes telephonic device 10b to send an activate whisper feature signal to the call processor 110 over line 52b. Upon receiving the activate whisper feature signal, the call processor 110 enables the whisper feature by sending a whisper control signal on lines 120 to switches 230 and 240. The whisper control signal received at switch 230 instructs the switch 230 to isolate (e.g., mute) audible input received from the user telephonic device 10a on line 54a so as to prevent audible input from, telephonic device 10a from being placed on line 64 towards terminal 30. The whisper control signal received at switch 240 instructs the switch 240 to route audible input received from the user telephonic device 10b to terminal 40 over line 74.

As before, audible output from both terminals 30 and 40 on lines 62 and 72, respectively, is provided to the respective user telephonic devices 10a and 10b on lines 56a and 56b via call handlers 130 and 140 to allow the user to simultaneously hear both of the parties on terminals 30 and 40 on different telephonic devices 10a and 10b. Thus, audible output from terminal 30 is routed to telephonic device 10a via call handler 130 and audible output from terminal 40 is routed to telephonic device 10b via call handler 140.

In another embodiment, the enhanced whisper feature is automatically activated by the call processor 110 when the user normally answers the call on telephonic device 10b (e.g., by picking up a handset or clicking on "talk" or other similar button on the telephonic device). Therefore, when the user answers the call on telephonic device 10b, the call processor 110 sends the whisper control signal on lines 120 to switches 230 and 240 to isolate (e.g., mute) audible input received from the user telephonic device 10a on line 54a and route audible input received from the user telephonic device 10b on line 54b to terminal 40 on line 74. Thereafter, the user can switch the audible input between the telephonic communication sessions by pressing the whisper button 20a or 20b on either telephonic device 10a or 10b.

In yet another embodiment, the enhanced whisper feature is automatically activated by the call processor 110 when the incoming call to telephonic device 10b is received at the call server 100. This allows an additional enhancement of a silent ring mode to be included in the enhanced whisper feature. For example, when the call server 100 receives the incoming call from terminal 40, the call server 100 can send a silent ring mode signal to telephonic device 10b to cause telephonic device 10b to activate a silent ring mode (e.g., vibrate) on the telephonic device 10b when alerting the user that an incoming call is being received on telephonic device 10b. The silent ring mode minimizes the disruption to the telephonic communication session occurring on telephonic device 10a. Thereafter, when the user answers the call on telephonic device 10b, the call processor 110 sends the whisper control signal on lines 120 to switches 230 and 240 to isolate (e.g., mute) audible input received from the user telephonic device 10a on line 54a and route audible input received from the user telephonic device 10b on line 54b to terminal 40 on line 74.

In still another embodiment, instead of the call processor 110 associating both of the telephonic devices 10a and 10b with the same user internally, and implementing the enhanced whisper feature based on this known association, the enhanced whisper feature can be enabled using a presence system 205. As shown in FIG. 2, the presence system 205 maintains presence information 220 on a presentity 290 and any user devices (e.g., telephonic devices 10a and 10b) associated with the presentity 290. The presence system 205 includes one or more presence user agents 250 (PUAs), a presence agent (PA) 210, a presence server 200 storing the presence information 220 of the presentity 290 and one or more watchers 260 of the presentity 290.

The PUAs 250 are capable of manipulating and providing presence information 220 on the presentity 290 to the PA 210. In FIG. 2, the call server 100 includes a PUA 250 that generates presence information on the presentity 290. Typically, the PUA 250 generates presence information when a change in presence status occurs. Examples of changes in presence status include, but are not limited to, turning on and off one of the telephonic devices 10a or 10b, modifying the registration from one of the telephonic devices 10a or 10b and initiating or answering a phone call on one of the telephonic devices 10 or 10b. Thus, the PUA 250 in the call server 100 is in communication with the call processor 110 to monitor the status of the telephonic devices 10a and 10b associated with the presentity 290, and generates presentity presence information 220 to the PA 210 upon initiation or termination of a telephonic communication session on telephonic device 10a and/or telephonic device 10b.

In addition, the PA 210 collects presence information from a calendar/scheduler application 270 (e.g., Microsoft Exchange Server®, IBM Lotus Notes®, Meeting Maker® or other similar application) and other sources 280 of presence information (e.g., an instant messaging application). For example, if a presentity has a meeting scheduled on his or her calendar from 10:00 a.m. to 12:00 p.m., at 10:00 a.m., the calendar/scheduler application 270 notifies the PA 210 to set the presentity's presence status to "In a Meeting." The PA 210 aggregates the presence information from each of the sources (e.g., PUA's 240, calendar 270 and other sources 280) and maintains the current complete presence information 220 for the presentity 290. The presence information 220 indicates, for example, the availability of the presentity, the current activity of the presentity, the local time where the presentity is located, the current location of the presentity and the current status of the active devices and/or applications running on active devices.

The PA 210 is further operable to provide the presence information 220 to one or more watchers 260 who have subscribed to the presence service of the presentity 290. In FIG. 2, the call server 100 is also a watcher 260 of the presentity 290. Therefore, the PA 210 provides real-time updates on the current presence status of the presentity 290 to the watcher 260 in the call server 100. The watcher 260 provides this presence information 220 to the call processor 110 for use in handling telephonic communication sessions with telephonic devices 10a and 10b.

For example, if the user/presentity 290 engages in a telephonic communication session with terminal 30 on telephonic device 10a, the PUA 250 in the call server 100 generates presence information 220 to the PA 210 indicating that the presentity 290 is involved in a telephonic communication session on telephonic device 10a. This presence information 220 is then provided by the PA 210 to the watcher 260 in the call server 100. Thereafter, if a request for the presentity 290 to engage in a telephonic communication session on telephonic device 10b is received from terminal 40, the PUA 250 in the call server 100 generates updated presence information 220 to the PA 210 indicating that this request was received. The PA 210, in turn, provides this updated presence information 220 to the watcher 260 in the call server 100. The watcher 260 can provide this updated presence information 220 to the call processor 110 for use in enabling the enhanced whisper feature, as described above (e.g., pressing the whisper button 20b or automatically enabling the whisper feature in the call processor 110).

In another embodiment, the presence server 200 can further store preference information 225 for the presentities 290, watchers 260 and/or administrators of the presence system 200. The preference information 225 operates to filter and/or add to the presence information 220 of a presentity 290 provided to a watcher 260 to accommodate privacy concerns, prioritization requirements, administrator policies and security considerations and to implement various features, such as the enhanced whisper feature.

For example, the preference information 225 can include a presentity preference to automatically enable the enhanced whisper feature at particular times, such as when an incoming call is received to a particular telephonic device or from a particular caller while the presentity 290 is on another phone. As a result, the call processor 110 only needs to maintain the algorithm for implementing the enhanced whisper feature, and the call processor 110 can execute the algorithm when the presence information 220 includes an instruction to do so. As another example, the preference information 225 can include an administrator or presentity preference to enable or disable the enhanced whisper feature at particular times during the day, on weekends, or during a particular meeting (e.g., a calendar entry can include a box that when checked either enables or disables the enhanced whisper feature).

The presence system 205 uses a presence protocol to provide presence services to presentities 290 and watchers 260. An example of a presence protocol that can be used in the presence system 205 is the Session Initiation Protocol (SIP), as described in J. Rosenberg, et al., "SIP: Session Initiation Protocol" RFC: 3261, June 2002 and in A. Roach, et al., "Session Initiation Protocol (SIP)—Specific Event Notification," RFC: 3265, June 2002, each of which are hereby incorporated by reference. SIP is an application-layer control protocol used to create, modify and terminate communication (voice, text and/or multimedia) sessions. SIP can be used with other protocols, such as the Real-time Transport Protocol (RTP), the Real-Time Streaming Protocol (RTSP), the Session Description Protocol (SDP), the International Telecommunication Union—Telecommunications ("ITU-T") H.263 standard (video CODEC), the G.711 and G.729 standards (audio CODECs), and other or additional standards or protocols. As will be appreciated, other or additional protocols and configurations may be used.

Figure 3:
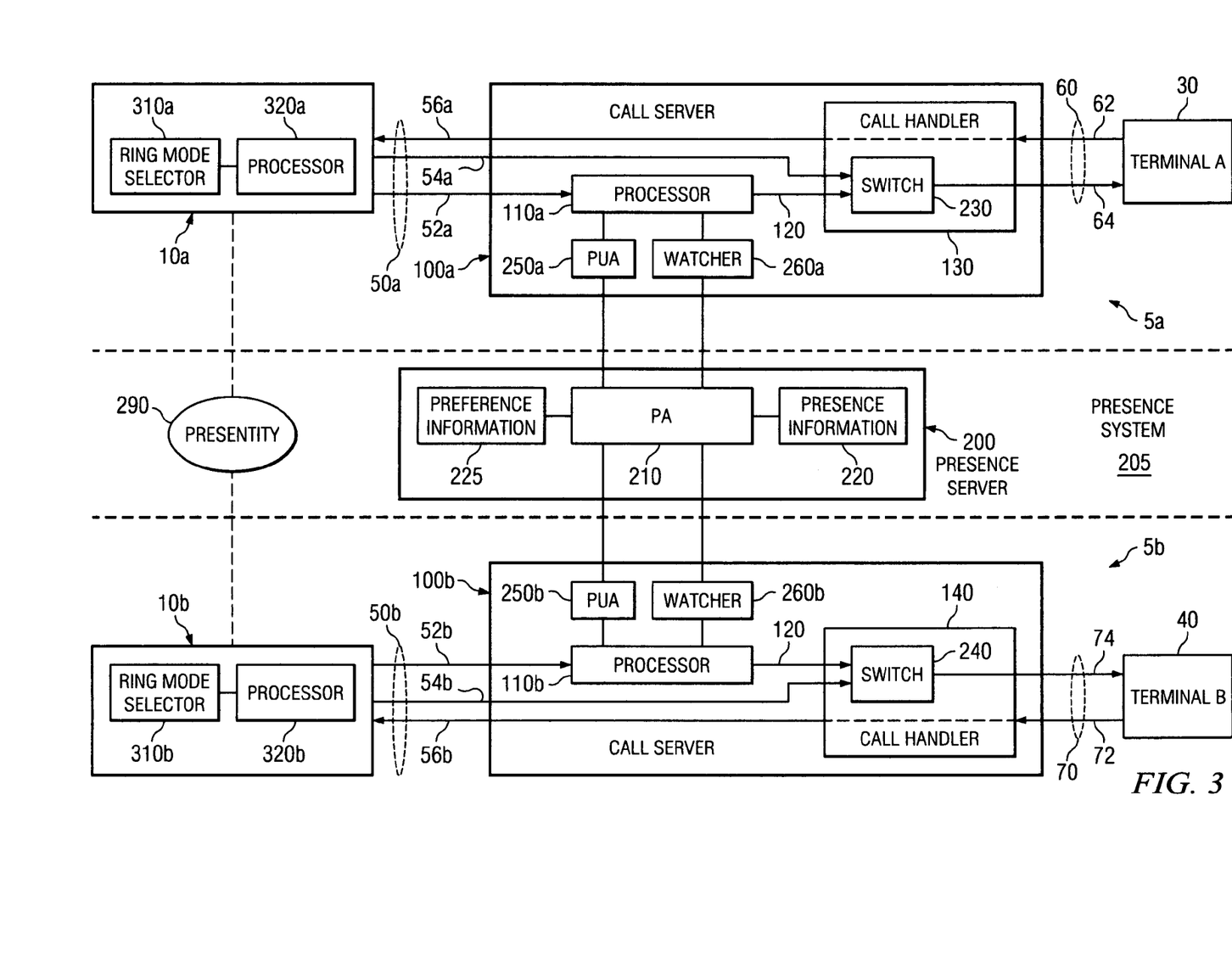
FIG. 3 is a block diagram illustrating another exemplary telephony system for providing a multi-telephony enhanced whisper feature on multiple call servers, in accordance with embodiments of the present invention.

FIG. 3 is a block diagram illustrating another exemplary telephony system for providing a multi-telephony enhanced whisper feature on multiple call servers, in accordance with embodiments of the present invention. In FIG. 3, each user telephonic device 10a and 10b is served by a different call server 100a and 100b within a different telephony system 5a and 5b, respectively. Thus, telephonic device 10a is in communication with call server 100a over interface 50a and telephonic device 10b is in communication with call server 100b over interface 50b. In addition, call handler 130, including switch 230, is associated with call server 100a to manage a telephonic communication session between telephonic device 10a and terminal 30 via call server 100a over interface 60, while call handler 140, including switch 240, is associated with call server 100b to manage a telephonic communication session between telephonic device 10b and terminal 40 via call server 100b over interface 70.

As in FIG. 2, telephonic devices 10a and 10b are associated with presentity 290. Therefore, each call server 100a and 100b includes a respective PUA 250a and 250b and watcher 260a and 260b. Each PUA 250a and 250b is in communication with the presence server 200 in presence system 205 to provide presence information 220 pertaining to the presentity 290 to the PA 210. In addition, each watcher 260a and 260b is in communication with the presence server 200 in presence system 205 to receive updated presence information 220 pertaining to the presentity from the PA 210.

Each call server 100a and 100b further includes a respective call processor 110a and 110b. Each call processor 110a and 110b is capable of enabling a respective enhanced whisper feature. For example, call processor 110a enables the whisper feature by sending a whisper control signal on line 120 to switch 230. The whisper control signal received at switch 230 instructs the switch 230 to isolate (e.g., mute) audible input received from the user telephonic device 10a on line 54a so as to prevent audible input from telephonic device 10a from being placed on line 64 towards terminal 30. As another example, call processor 110b enables the whisper feature by sending a whisper control signal on line 120 to switch 240. The whisper control signal received at switch 240 instructs the switch 240 to isolate audible input received from the user telephonic device 10b on line 54b from being placed on line 74 towards terminal 40.

As before, audible output from both terminals 30 and 40 on lines 62 and 72, respectively, is provided to the respective user telephonic devices 10a and 10b on lines 56a and 56b via call handlers 130 and 140 within call servers 100a and 100b, respectively, to allow the user to simultaneously hear both of the parties on terminals 30 and 40 on different telephonic devices 10a and 10b. Thus, audible output from terminal 30 is routed to telephonic device 10a via call handler 130 and call server 100a and audible output from terminal 40 is routed to telephonic device 10b via call handler 140 and call server 100b.

In an exemplary embodiment, if the user/presentity 290 engages in a telephonic communication session with terminal 30 on telephonic device 10a, the PUA 250a in the call server 100a generates presence information 220 to the PA 210 indicating that the presentity 290 is involved in a telephonic communication session on telephonic device 10a. This presence information 220 is then provided by the PA 210 to the watcher 260b in the call server 100b. Thereafter, if a request for the presentity 290 to engage in a telephonic communication session on telephonic device 10b is received from terminal 40, the PUA 250b in the call server 100b generates updated presence information 220 to the PA 210 indicating that this request was received. The PA 210, in turn, provides this updated presence information 220 to the watcher 260a in the call server 100a. The watcher 260a can provide this updated presence information 220 to the call processor 110a in call server 100a for use in enabling the enhanced whisper feature. For example, the enhanced whisper feature can be enabled automatically by the call processor 110a or in response to preference information 225 stored in the presence server 200, as described above.

The enhanced whisper feature can also provide a silent ring mode feature, described above. For example, when the watcher 260b in call server 100b receives updated presence information 220 indicating that the request has been received while the presentity is involved in another telephonic communication session, and the watcher 260b provides this updated presence information 220 to the call processor 110b in call server 100b, the call processor 10b can send a silent ring mode signal to telephonic device 10b. In FIG. 3, telephonic device 10b is shown including a ring mode selector 310b controlled by processor 320b to implement the silent ring tone feature. Upon receiving the silent ring mode signal, the processor 320b switches the ring mode selector 310b to a silent ring mode (e.g., vibrate) while alerting the user that an incoming call is being received on telephonic device 10b. The silent ring mode feature can be implemented on either telephonic device 10a or 10b using processor 320a or 320b and associated respective ring mode selector 310a or 310b, depending on which telephonic device 10a or 10b is involved in the first telephonic communication session.

In addition, the user can send a "switch whisper" signal on either line 52a or 52b to call server 100a or 100b to switch between the telephonic communication sessions. For example, if the user presses the whisper button (20, shown in FIG. 2) on user telephonic device 10b, the user telephonic device 10b sends a switch whisper signal to the call processor 10b in call server 100b over line 52b. Upon receiving the switch whisper signal, if speech is currently routed from telephonic device 10b to terminal 40, the call processor 110b transmits a new whisper control signal on line 120 to switch 240 that instructs the switch 240 to isolate, or effectively mute, the audible input received from telephonic device 10b.

The call processor 10b also notifies the PUA 250b that the user desires to switch between telephonic communication sessions, and the PUA 250b provides updated presence information 220 indicating the desire to switch to the PA 210. The PA 210, in turn, provides this updated presence information 220 to the watcher 260a in call server 100a, which causes the call processor 110a in call server 100a to transmit a new whisper control signal on line 120 to switch 230. The new whisper control signal received at switch 230 instructs the switch 230 to again route audible input received from the user telephonic device 10a on line 54a to call handler 130 for transmission to terminal 30 over line 64.

Figure 4:
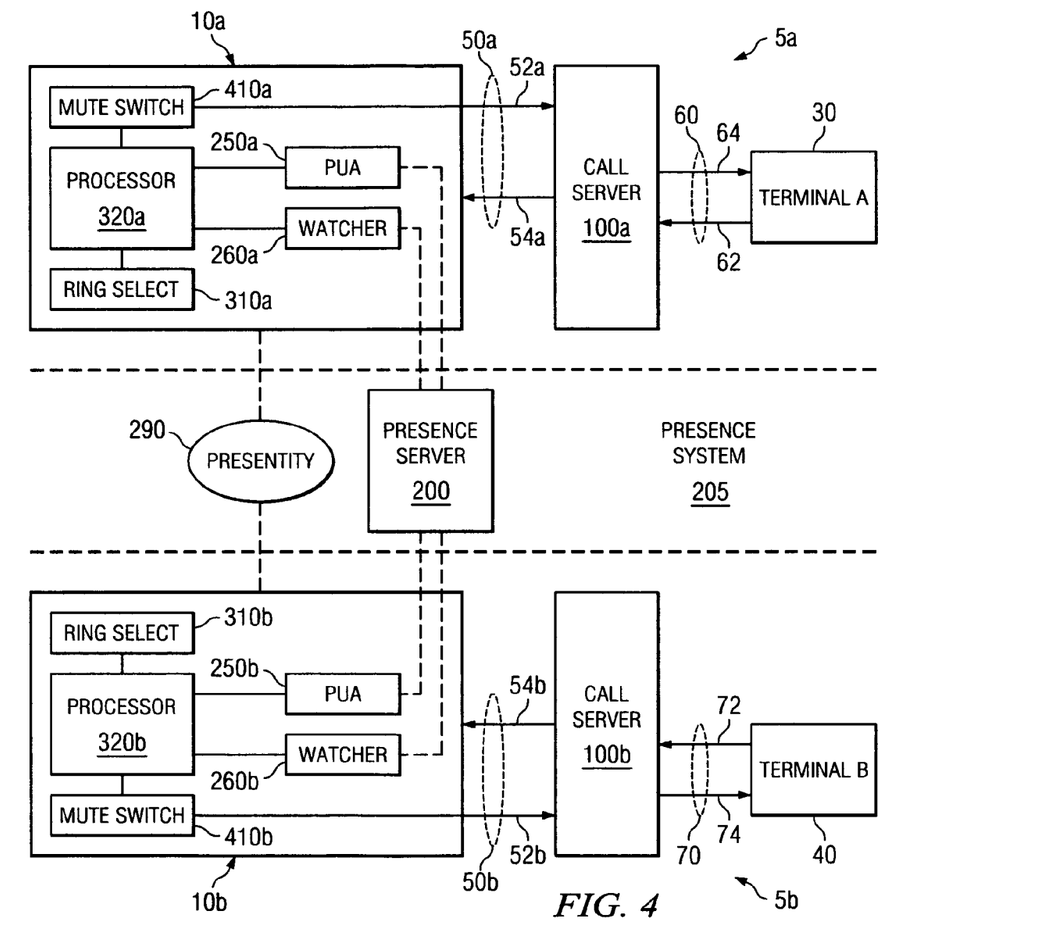
FIG. 4 is a block diagram illustrating another exemplary telephony system for providing a multi-telephony enhanced whisper feature on user telephonic devices, in accordance with embodiments of the present invention.

FIG. 4 is a block diagram illustrating another exemplary telephony system for providing a multi-telephony enhanced whisper feature on user telephonic devices, in accordance with embodiments of the present invention. In FIG. 4, each user telephonic device 10a and 10b is again served by a different call server 100a and 100b within a different telephony system 5a and 5b, respectively. Thus, telephonic device 10a is in communication with call server 100a over interface 50a and telephonic device 10b is in communication with call server 100b over interface 50b. In addition, each telephonic device 10a and 10b is shown involved in a disparate telephonic communication session with a respective terminal 30 and 40 over respective interfaces 60 and 70. However, instead of implementing the whisper switch functionality within the call servers 100a and 100b as shown in FIGS. 1-3, in FIG. 4, the whisper switch functionality is implemented by respective mute switches 410a and 410b within telephonic devices 10a and 10b.

As before, telephonic devices 10a and 10b are associated with presentity 290. However, PUA 250a and watcher 260a are implemented within telephonic device 10a and PUA 250b and watcher 260b are implemented within telephonic device 10b. Each PUA 250a and 250b is in communication with the presence server 200 in presence system 205 to provide presence information 220 pertaining to the presentity 290 to the presence server 200. In addition, each watcher 260a and 260b is in communication with the presence server 200 in presence system 205 to receive updated presence information 220 pertaining to the presentity from the presence server 200.

Telephonic devices 10a and 10b further include respective processors 320a and 320b for controlling mute switches 410a and 410b and ring mode selectors 310a and 310b, respectively. Each processor 320a and 320b is capable of enabling a respective enhanced whisper feature. For example, processor 320a enables the whisper feature by instructing the mute switch 410a to mute the microphone on telephonic device 10a to prevent audible input from being sent from telephonic device 10a to call server 100a. As another example, processor 320b enables the whisper feature by instructing the mute switch 410b to mute the microphone of the user telephonic device 10b.

As before, audible output from both terminals 30 and 40 on lines 62 and 72, respectively, is provided to the respective user telephonic devices 10a and 10b on lines 56a and 56b via call servers 100a and 100b, respectively, to allow the user to simultaneously hear both of the parties on terminals 30 and 40 on different telephonic devices 10a and 10b. In addition, audible input from the telephonic device 10a or 10b that is not muted is transmitted over line 52a or 52b to call server 100a or 10b, and from call server 100a or 100b to terminal 30 or 40 over line 64 or 74.

In an exemplary embodiment, if the user/presentity 290 engages in a telephonic communication session with terminal 30 on telephonic device 10a, the PUA 250a in telephonic device 10a generates presence information 220 to the presence server 200 indicating that the presentity 290 is involved in a telephonic communication session on telephonic device 10a. This presence information 220 is then provided by the presence server 200 to the watcher 260b in telephonic device 10b. Thereafter, if a request for the presentity 290 to engage in a telephonic communication session on telephonic device 10b is received from terminal 40, the PUA 250b in telephonic device 10b generates updated presence information 220 to the presence server 200 indicating that this request was received. The presence server 200, in turn, provides this updated presence information 220 to the watcher 260a in telephonic device 10a. The watcher 260a can provide this updated presence information 220 to the processor 320a in telephonic device 10a for use in enabling the enhanced whisper feature, as described above.

In addition, when the watcher 260b in telephonic device 10b receives updated presence information 220 indicating that the request has been received at telephonic device 10b while the presentity is involved in another telephonic communication session on telephonic device 10a, the watcher 260b provides this updated presence information 220 to the processor 320b in telephonic device 10b. The processor 320b in telephonic device 320b can switch the ring mode selector 310b to a silent ring mode (e.g., vibrate) while alerting the user that an incoming call is being received on telephonic device 10b.

Figure 5:
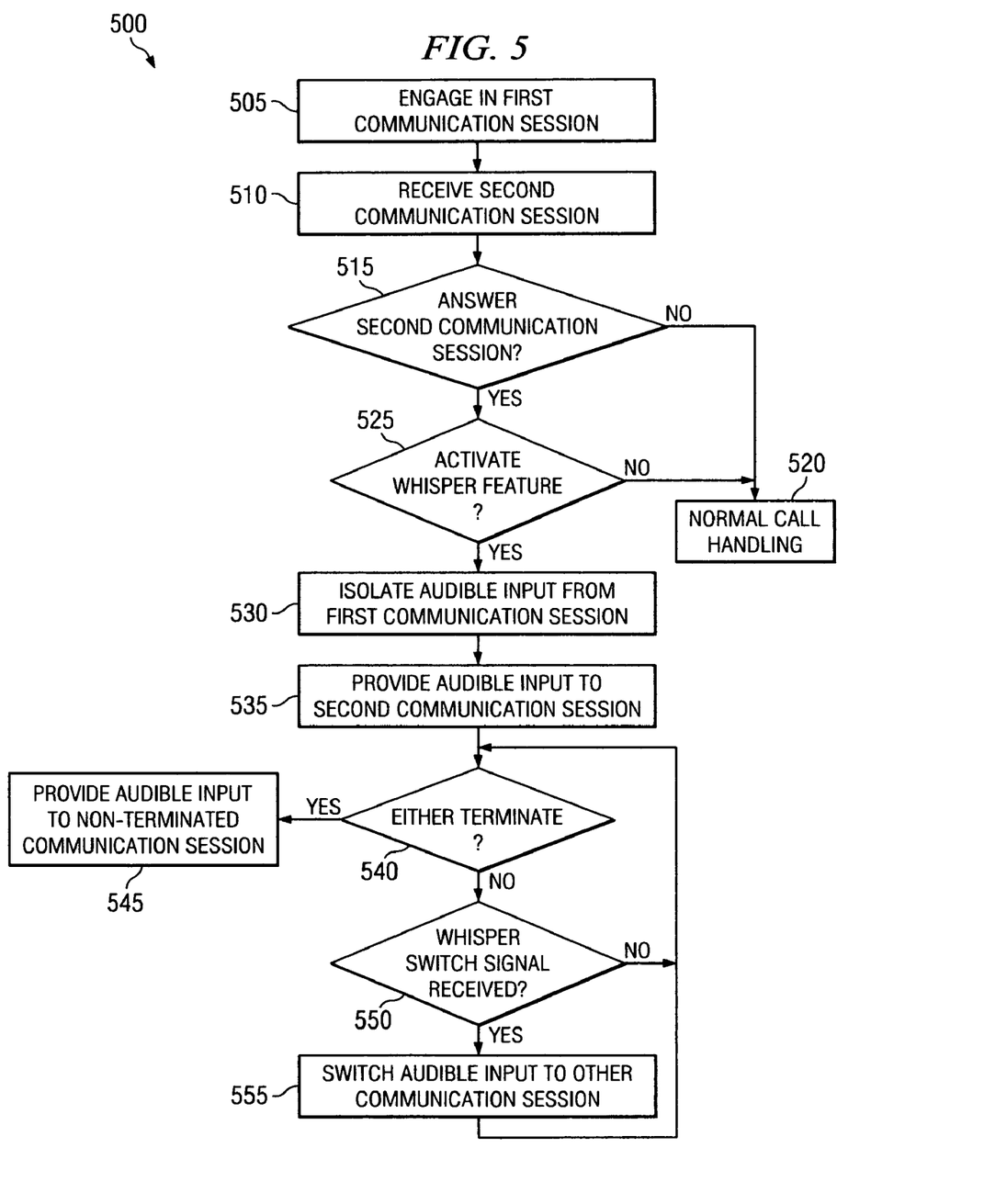
FIG. 5 is a flowchart illustrating an exemplary process for providing an enhanced whisper feature to enable a user to simultaneously engage in disparate telephonic communication sessions, in accordance with embodiments of the present invention.

FIG. 5 is a flowchart illustrating an exemplary process 500 for providing an enhanced whisper feature to enable a user to simultaneously engage in disparate telephonic communication sessions, in accordance with embodiments of the present invention. At block 505, a user engages in a first telephonic communication session. At block 510, the user receives a request to engage in a second telephonic communication session. If, at blocks 515 and 520, the user either does not answer the second telephonic communication session or has not activated the enhanced whisper feature, normal call handling is applied to the second telephonic communication session.

However, if at block 515, the user does answer the second telephonic communication session, and at block 520, the enhanced whisper feature has been activated, the audible input of the user is isolated from the first telephonic communication session and provided to the second telephonic communication session at blocks 530 and 535. If, at block 540, either the first telephonic communication session or the second telephonic communication session terminates, the audible input of the user is provided to the non-terminated telephonic communication session at block 545. For example, if the audible input of the user is currently isolated from the first telephonic communication session and the second telephonic communication session terminates, the audible input of the user is again provided to the first telephonic communication session.

If during the time that the first and second telephonic communication sessions are concurrent, a switch whisper signal is received at block 550, the audible input of the user is switched between communication sessions at block 555. For example, if the audible input of the user is currently isolated from the first telephonic communication session when the switch whisper signal is received, the audible input of the user is again provided to the first telephonic communication session, while the audible input of the user is isolated from the second telephonic communication session.

Figure 6:
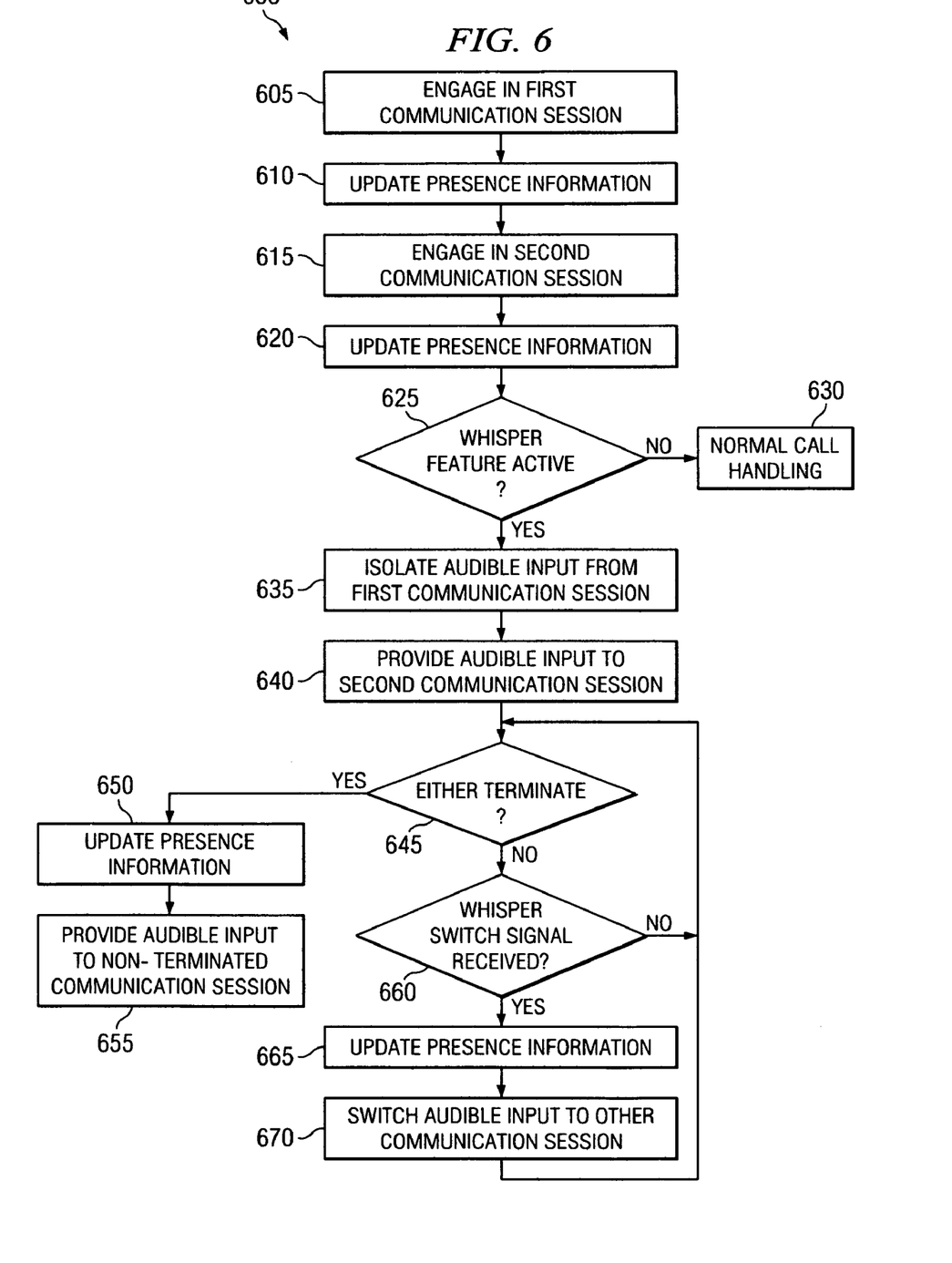
FIG. 6 is a flowchart illustrating an exemplary process for providing a presence-enhanced whisper feature to enable a user to simultaneously engage in disparate telephonic communication sessions, in accordance with embodiments of the present invention.

FIG. 6 is a flowchart illustrating an exemplary process 600 for providing a presence-enhanced whisper feature to enable a user to simultaneously engage in disparate telephonic communication sessions, in accordance with embodiments of the present invention. At block 605, a user/presentity engages in a first telephonic communication session. At block 610, the presence information of the presentity is updated to reflect the first telephonic communication session. When the user/presentity engages in a second communication session at block 615, the presence information of the presentity is again updated to reflect the second communication session at block 620. If, at block 625, the user/presentity has not activated the enhanced whisper feature, normal call handling is applied to the second telephonic communication session.

However, if at block 625, the user/presentity has activated the enhanced whisper feature, the audible input of the user is isolated from the first telephonic communication session and provided to the second telephonic communication session at blocks 635 and 640. If, at block 645, either the first telephonic communication session or the second telephonic communication session terminates, the presence information of the presentity is again updated at block 650 to reflect the termination and the audible input of the user is provided to the non-terminated telephonic communication session at block 655. If during the time that the first and second telephonic communication sessions are concurrent, a switch whisper signal is received at block 660, the presence information of the presentity is again updated at block 665 and the audible input of the user is switched between communication sessions at block 670.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

I claim:

1. A telephony system for providing a presence-enhanced whisper feature that enables a user to simultaneously engage in disparate telephonic communication sessions, said telephony system comprising:
a presence system maintaining presence information indicating the user is involved in a first telephonic communication session, wherein said presence system is operable to receive updated presence information indicating a request for the user to engage in a second telephonic communication session has been received, the presence system further operable to transmit an instruction to enable the whisper feature of the user upon determining that the user is currently engaged in the first telephonic communication session when the request for the user to engage in the second telephonic communication session is received;
a user telephonic device associated with the user that is engaged in the first telephonic communication session and the second telephonic communication session; and
a switch within a housing of said user telephonic device, said switch being in communication with the presence system to receive the instruction and enable the whisper feature by isolating audible input of the user from the first telephonic communication session while providing audible output from each of the first telephonic communication session and the second telephonic communication session to the user.

2. The telephony system of claim 1, wherein said presence system is operable to provide said updated presence information to watchers of the user to enable the whisper feature.

3. The telephony system of claim 2, wherein said request is a request to establish the second telephonic communication session, and wherein said updated presence information causes said switch to isolate the audible input of the user from the first telephonic communication session and provide the audible input of the user to the second telephonic communication session.

4. The telephony system of claim 2, wherein said request is a request for said switch to switch between the first telephonic communication session and the second telephonic communication session to isolate the audible input of the user from the first telephonic communication session and provide the audible input of the user to the second telephonic communication session.

5. The telephony system of claim 2, wherein said user telephonic device is a watcher of the user that receives said updated presence information and controls said switch in response to said updated presence information.

6. The telephony system of claim 2, wherein:
said user telephonic device includes a first user telephonic device associated with the first telephonic communication session and a second user telephonic device associated with the second telephonic communication session;
said switch includes a first switch contained within a first housing of said first user telephonic device and a second switch contained within a second housing of said second user telephonic device;
said first switch enabling the whisper feature by isolating the audible input of the user from the first telephonic communication session while providing the audible output from the first telephonic communication session to the user;
said second switch providing the audible input of the user to the first telephonic communication session while providing the audible output from the second telephonic communication session to the user; and
said second user telephonic device further being a watcher of the user that receives said updated presence information and automatically activates a silent ring mode in response to receipt of the updated presence information and the request for the user to engage in the second telephonic communication session.

7. A method for providing a whisper feature to enable a user to simultaneously engage in disparate active telephonic communication sessions, said method comprising the steps of:
receiving presence information at a presence system indicating that the user is actively engaged in a first telephonic communication session;
receiving updated presence information at the presence system indicating a request for the user to actively engage in a second telephonic communication session has been received;
transmitting an instruction from the presence system to a switch contained within a housing of a user telephonic device associated with the user that is engaged in the first telephonic communication session and the second telephonic communication session to enable the whisper feature of the user upon determining that the user is currently engaged in the first telephonic communication session when the request for the user to engage in the second telephonic communication session is received;
isolating audible input of the user from the first telephonic communication session at the switch;
providing the audible input of the user to the second telephonic communication session by the switch; and
providing audible output from each of the first telephonic communication session and the second telephonic communication session to the user by the switch.

8. The method of claim 7, wherein the step of providing the audible output further comprises:
converging the audible output of the first telephonic communication session and the second telephonic communication session.

9. The method of claim 7, further comprising the steps of:
determining the second telephonic communication session is terminated; and
providing the audible input of the user to the first telephonic communication session.

10. The method of claim 7, further comprising the steps of:
receiving a switch whisper signal from the user to switch from the second telephonic communication session and the first telephonic communication session;
in response to said switch whisper signal, isolating audible input of the user from the second telephonic communication session;
providing the audible input of the user to the first telephonic communication session; and
providing audible output from each of the first telephonic communication session and the second telephonic communication session to the user.

11. The method of claim 7, wherein said user telephonic device includes a first user telephonic device associated with the first telephonic communication session and a second user telephonic device associated with the second telephonic communication session and said switch includes a first switch contained within a first housing of said first user telephonic device and a second switch contained within a second housing of said second user telephonic device, and further comprising the steps of:

enabling, by said first switch, the whisper feature by isolating the audible input of the user from the first telephonic communication session while providing the audible output from the first telephonic communication session to the user;

providing, by said second switch, the audible input of the user to the first telephonic communication session while providing the audible output from the second telephonic communication session to the user;

receiving, by said second user telephonic device said updated presence information; and automatically activating a silent ring mode on the second user telephonic device in response to receipt of the updated presence information and the request for the user to engage in the second telephonic communication session.

* * * * *